(12) United States Patent
Knights et al.

(10) Patent No.: US 6,500,572 B2
(45) Date of Patent: Dec. 31, 2002

(54) METHOD FOR OPERATING FUEL CELLS ON IMPURE FUELS

(75) Inventors: Shanna D. Knights, Burnaby (CA); Michael V. Lauritzen, Burnaby (CA); Rajeev Vohra, Burnaby (CA); David P. Wilkinson, North Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 137 days.

(21) Appl. No.: 09/772,036

(22) Filed: Jan. 29, 2001

(65) Prior Publication Data
US 2001/0028966 A1 Oct. 11, 2001

Related U.S. Application Data

(62) Division of application No. 09/221,206, filed on Dec. 23, 1998, now Pat. No. 6,210,820
(60) Provisional application No. 60/091,531, filed on Jul. 2, 1998.

(51) Int. Cl.⁷ .............................. H01M 8/00; H01M 8/04
(52) U.S. Cl. ............................. 429/13; 429/12; 429/17; 429/22
(58) Field of Search .............................. 429/12, 13, 17, 429/22

(56) References Cited

U.S. PATENT DOCUMENTS

| | | | |
|---|---|---|---|
| 4,910,099 A | 3/1990 | Gottesfield | 429/13 |
| 5,482,680 A | 1/1996 | Wilkinson et al. | 422/177 |
| 5,637,415 A | 6/1997 | Meltser et al. | 429/17 |
| 5,712,052 A | 1/1998 | Kawatsu | 429/13 |
| 5,843,195 A * | 12/1998 | Aoyama | 48/127.7 |
| 5,935,726 | 8/1999 | Chow et al. | |
| 6,096,448 | 8/2000 | Wilkinson et al. | 429/13 |

FOREIGN PATENT DOCUMENTS

| | | |
|---|---|---|
| EP | 0 862 233 | 9/1998 |
| JP | 60-54176 | 3/1985 |
| JP | 8-167420 | 6/1996 |
| WO | WO 92/10009 | 6/1992 |

OTHER PUBLICATIONS

Gulari et al., "Catalytic Oxidation of Carbon Monoxide Under Periodic and Transient Operation," *Catalysis Today*, vol. 25, pp. 145–157, 1995.
Wilkinson et al., "Materials and Approaches for CO and CO2 Tolerance for Polymer Electrolyte Membrane Fuel Cells," Second International Symposium on New Materials for Fuel Cell and Modern Battery Systems, Jul., 1997.
U.S. patent application Ser. No. 60/091,531, Wilkinson et al.

* cited by examiner

Primary Examiner—Stephen Kalafut
Assistant Examiner—Angela J Martin
(74) Attorney, Agent, or Firm—McAndrews, Held & Malloy, Ltd.

(57) ABSTRACT

The electrocatalysts in certain fuel cell systems can be poisoned by impurities in the fuel stream directed to the fuel cell anodes. Introducing a variable concentration of oxygen into the impure fuel stream supplied to the fuel cells can reduce or prevent poisoning without excessive use of oxygen. The variation may be controlled based on the voltage of a carbon monoxide sensitive sensor cell incorporated in the system. Further, the variation in oxygen concentration may be periodic or pulsed. A variable air bleed method is particularly suitable for use in solid polymer fuel cell systems operating on fuel streams containing carbon monoxide.

17 Claims, 4 Drawing Sheets

METHOD FOR OPERATING FUEL CELLS ON IMPURE FUELS

CROSS-REFERENCE TO RELATED APPLICATION(S)

This application is a division of U.S. patent application Ser. No. 09/221,206 filed Dec. 23, 1998, now U.S. Pat. No. 6,210,820 B1, which is, in turn, related to and claims priority from U.S. Provisional Patent Application Ser. No. 60/091,531 filed Jul. 2, 1998, entitled "Sensor Cell For An Electrochemical Fuel Cell Stack". The '206 non-provisional and '531 provisional applications are each incorporated herein by reference in their entirety.

FIELD OF THE INVENTION

The present invention relates to methods for operating fuel cells on impure fuels. In particular, it relates to methods for substantially reducing the effect of or preventing carbon monoxide poisoning of fuel cell anode electrocatalysts by introduction of a variable concentration of oxygen into the fuel stream.

BACKGROUND OF THE INVENTION

Electrochemical fuel cells convert reactants, namely fuel and oxidant, to generate electric power and reaction products. Electrochemical fuel cells generally employ an electrolyte disposed between two electrodes, namely a cathode and an anode. An electrocatalyst typically induces the desired electrochemical reactions at the electrodes. In addition to electrocatalyst, the electrodes may also comprise a porous electrically conductive sheet material, or "electrode substrate", upon which the electrocatalyst is deposited. The electrocatalyst may be a metal black, an alloy or a supported metal catalyst, for example, platinum on carbon.

Solid polymer electrolyte fuel cells employ a membrane electrode assembly ("MEA") which comprises a solid polymer electrolyte or ion-exchange membrane disposed between the two electrode layers. Separator plates, or flow field plates, for directing the reactants across one surface of each electrode substrate, are disposed on each side of the MEA. Solid polymer fuel cells operate at relatively low temperatures (circa 80° C.) compared to other fuel cell types.

A broad range of reactants can be used in electrochemical fuel cells. For example, the fuel stream may be substantially pure hydrogen gas, a gaseous hydrogen-containing reformate stream, or methanol in a direct methanol fuel cell. The oxidant may be, for example, substantially pure oxygen or a dilute oxygen stream such as air.

The fuel stream may contain impurities that do not contribute to, and may actually inhibit, the desired electrochemical reaction. These impurities may, for example, originate from the fuel stream supply itself, or may be generated, for example, as intermediate species during the fuel cell reactions, or may be impurities entering the fuel stream from elsewhere in the system. Some of these impurities may be chemically adsorbed or physically deposited on the surface of the anode electrocatalyst, blocking the active electrocatalyst sites and preventing these portions of the anode electrocatalyst from inducing the desired electrochemical fuel oxidation reaction. Such impurities are known as electrocatalyst "poisons" and their effect on electrochemical fuel cells is known as "electrocatalyst poisoning". Electrocatalyst poisoning thus results in reduced fuel cell performance, where fuel cell performance is defined as the voltage output from the cell for a given current density. Higher performance is associated with higher voltage for a given current density or higher current for a given voltage.

In the absence of countermeasures, the adsorption or deposition of electrocatalyst poisons may be cumulative, so even minute concentrations of poisons in a fuel stream, may, over time, result in a degree of electrocatalyst poisoning which is detrimental to fuel cell performance.

Reformate streams derived from hydrocarbons or oxygenated hydrocarbons typically contain a high concentration of hydrogen fuel, but typically also contain electrocatalyst poisons such as carbon monoxide. To reduce the effects of anode electrocatalyst poisoning, it is known to pre-treat the fuel supply stream prior to directing it to the fuel cell. For example, pre-treatment methods may employ catalytic or other means to convert carbon monoxide to carbon dioxide. However, known pre-treatment means for reformate streams cannot efficiently remove 100% of the carbon monoxide. Even trace amounts less than 10 parts per million (ppm can) eventually result in electrocatalyst poisoning which causes a reduction in fuel cell performance.

Substances other than carbon monoxide are also known to poison fuel cell electrocatalysts. Poisons may also be generated by the reaction of substances in the reactant streams with the fuel cell component materials. For instance, carbon monoxide or other impurities can be generated from carbon dioxide in the presence of an electrocatalyst. This can occur when there is a relative abundance of carbon dioxide and a relatively low concentration of carbon monoxide such that equilibrium conditions favor some limited carbon monoxide formation. What constitutes a poison may depend on the nature of the fuel cell. For example, whereas methanol is the fuel in a direct methanol fuel cell, in a hydrogen fuel cell operating on a methanol reformate stream, traces of unreformed methanol can be detrimental to the electrocatalyst performance.

Conventional methods for addressing the problem of anode electrocatalyst poisoning include purging the anode with an inert gas such as nitrogen. However, such purging methods involve suspending the generation of power by the fuel cell, thus a secondary power source may be needed to provide power while the fuel cell anode is being purged.

Another approach for removing poisons from an electrocatalyst comprises introducing a "clean" fuel stream containing substantially no carbon monoxide or other poisons to a poisoned fuel cell anode. Where the adsorption is reversible, an equilibrium process may result in some rejuvenation of the electrocatalyst. However, a disadvantage of this approach is that it is generally not effective against irreversibly adsorbed poisons. Furthermore, the recovery of the anode electrocatalyst by such an equilibrium process can be very slow, during which time the fuel cell is not able to operate at full capacity.

Another technique for counteract carbon monoxide electrocatalyst poisoning is to continuously introduce a low concentration of oxygen into the fuel stream upstream of the fuel cell, as disclosed in U.S. Pat. No. 4,910,099. Therein, oxygen levels from about 2% to 6% were injected into fuel streams having carbon monoxide levels from about 100 to 500 ppm. However, such an oxygen bleed into the fuel stream results in some consumption of hydrogen and hence a reduction in fuel efficiency. Further, an oxygen bleed results in undesirable localized exothermic reactions at the anode, particularly near the fuel inlet, which may damage fuel cell membranes and reduce fuel cell lifetime. Further still, since in practice oxygen bleed is typically obtained by compressing air (it is often drawn from a compressed air stream provided as a fuel cell oxidant), use of an oxygen bleed may result in an additional parasitic load on a fuel cell system. Thus, the use of an excessive amount of oxygen bleed is undesirable.

To efficiently and effectively counteract carbon monoxide poisoning, it is desirable to know the approximate concentration of carbon monoxide in the fuel stream. However, directly measuring the concentration of carbon monoxide in a fuel stream can be difficult in practice. Thus, while a sensor for directly measuring carbon monoxide is desirable in a fuel cell system, often the concentration is inferred based on the known operating conditions of the fuel cell system (for example, carbon monoxide concentrations can be determined under various operating conditions in a laboratory and can then be inferred for a fuel cell system operating under similar conditions in actual use). While many early fuel cell applications may have had relatively constant operating conditions and therefore relatively consistent levels of carbon monoxide in the fuel stream, the potential applications for fuel cells are expanding. As a result, the carbon monoxide concentration in the fuel streams now tends to vary for many reasons (for example, depending on reformer temperature, or fuel cell and/or reformer load demand conditions).

A low output voltage from one or more of the fuel cells in a fuel cell system might be used as an indicator of carbon monoxide poisoning. Preferably perhaps, a sensor cell might be incorporated in the fuel cell system for this purpose. As described in U.S. Provisional Patent Application Ser. No. 60/091,531 filed Jul. 2, 1998, by the same applicant as the present application and previously incorporated herein by reference in its entirety, a sensor cell can be incorporated whose performance is more sensitive to carbon monoxide poisoning than other fuel cells in the fuel cell system. Thus, a sensor cell can be used to indicate an abnormal or undesirable operating condition (for example, high level of CO) before it affects the performance of the other fuel cells.

U.S. patent application Ser. No. 08/998,133, filed Dec. 23, 1997, by the same applicant as the present application, discloses a fuel cell operating method in which a substantially fuel-free liquid (which may contain oxygen) is periodically introduced into the fuel stream in order to cause a fuel starved condition.

SUMMARY OF THE INVENTION

Introducing a variable concentration of oxygen into an impure fuel stream can be advantageous for the removal of fuel stream impurities. If oxygen is introduced in accordance with the impurity level in the fuel stream, fuel losses, localized heating, and parasitic losses can be reduced. Further, a method involving a periodic or intermittent introduction of oxygen has been shown to be effective to remove impurities using a smaller integrated amount of oxygen than a method involving a constant introduction of oxygen.

These advantages may be obtained in a fuel cell system which includes a fuel cell operating on a stream of impure fuel supplied to the fuel cell, and which includes a mechanism for introducing oxygen into the fuel stream for reaction with an impurity in the fuel stream within the fuel cell. The method is particularly suitable for use in systems comprising solid polymer fuel cells that operate at relatively low temperatures.

It can be advantageous to vary the concentration of oxygen introduced in accordance with a fuel cell system operating characteristic indicative of the concentration of the impurity. Suitable operating-characteristics for this purpose include the voltage of a sensor fuel cell incorporated in the system that is sensitive to a particular impurity, or the concentration of an impurity monitored or measured by an impurity sensor located somewhere in the fuel stream. Additionally, other suitable operating characteristics include the voltage of another fuel cell in the system, the voltage drop across a part of a cell (for example, the voltage differential between parts of a cell associated with a partial length of a flow field), and the temperature of a component of the fuel cell system (for example, the temperature of a reformer). The concentration of oxygen introduced into the fuel stream is desirably adjusted in response to measured or monitored variations in one or more of these operating characteristics.

In principle, it can also be advantageous to vary the amount of oxygen introduced into the fuel stream independently of the operating state of the fuel cell system. For instance, it can be advantageous to introduce oxygen into the fuel stream periodically, such as in a series of periodic pulses rather than in a continuous (steady state) manner. This technique results in a similar removal of impurities, but using a smaller total amount of oxygen. It is particularly preferred to also vary the concentration of oxygen introduced in accordance with a fuel cell system operating characteristic indicative of the concentration of the impurity.

A periodic or cyclic variation in the concentration of oxygen introduced into the fuel stream can be characterized by a waveform (for example, sinusoidal, sawtooth, square wave pulse). Further, the concentration of oxygen introduced can be varied cyclically but also in proportion to an operating characteristic of the fuel cell system indicative of impurity concentration, such as in a series of pulses whose number or amplitude vary in proportion to an impurity concentration detected.

The method is particularly suitable for substantially reducing the effect of or preventing carbon monoxide poisoning of an anode electrocatalyst, although similar benefits can be expected with regards to poisons originating from carbon dioxide or other oxidizable impurities. The method is effective when the fuel stream comprises at least up to about 1000 ppm carbon monoxide.

In the preceding, oxygen introduced may be substantially pure oxygen, in a dilute oxygen stream such as air, in an oxygen containing solution, or generated in-situ from a suitable compound such as hydrogen peroxide. In a preferred embodiment of the method, for use with fuel streams comprising carbon monoxide impurity, less than about 4% air by volume is introduced in periodic pulses. The period of the pulses may be in the range from about 1 to 50 seconds. The pulse duration or width may be less than about half the period of the pulses. In addition to such periodic pulses of air, a steady baseline concentration of air bleed (for instance less than about 0.8% by volume of the fuel stream) may be maintained in the fuel stream between pulses. In this way, some lower level of oxygen bleed is maintained at all times for baseline carbon monoxide scavenging or for purposes of carbon dioxide scavenging.

Embodiments of the methods described above can substantially reduce the effect of electrocatalyst poisoning without substantially affecting the electrical output of the fuel cells in the system. As long as a sufficient concentration of fuel is maintained in the fuel stream, temporary fuel starvation can be generally avoided. Fuel starvation occurs when the fuel stoichiometry (the ratio of the amount of fuel supplied to the amount of fuel actually consumed in the electrochemical reactions) is less than 1 and is characterized by a rise in the anode voltage in the system fuel cells, possibly resulting in fuel cell reversal in some cells (that is, where the cell voltage goes below zero).

To carry out embodiments of the above method, a mechanism is included in the fuel cell system for introducing a variable amount of oxygen into the fuel stream for reaction with an impurity in the fuel stream within the fuel cell. The oxygen introducing mechanism can comprise, for example, a flow controller for periodically introducing pulses of oxygen into the fuel stream. Further, the system can comprise one or more monitoring devices for monitoring a fuel cell operating characteristic, such as those described above, and a controller responsive to the monitoring device for adjusting the concentration of oxygen introduced into the fuel stream. The monitoring device may preferably comprise a sensor fuel cell.

DETAILED DESCRIPTION OF PREFERRED EMBODIMENT(S)

Figure 1:
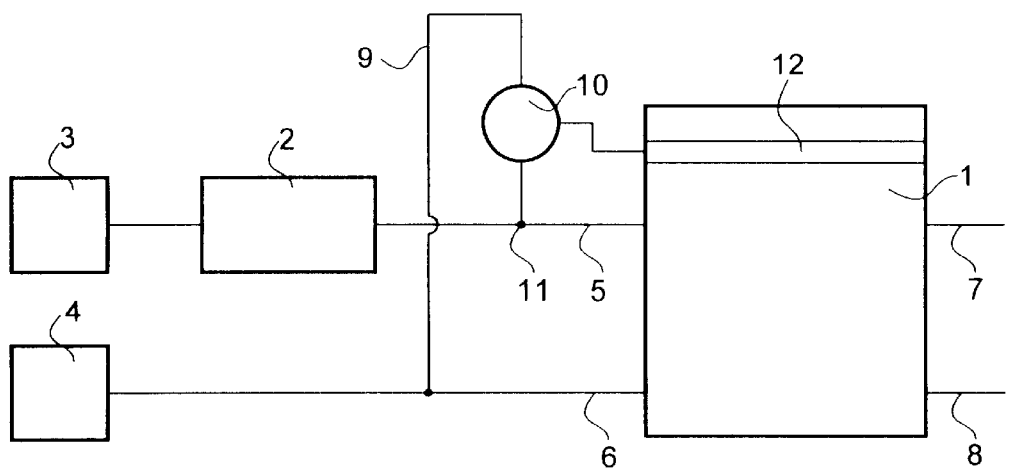
FIG. 1 is a schematic diagram of a solid polymer fuel cell system comprising a reformers a variable air bleed flow controller, and a carbon monoxide sensor cell.

A preferred embodiment of a fuel cell system equipped to introduce a variable amount of oxygen into the fuel stream directed to the fuel cells in the system is shown in the schematic diagram of FIG. 1. The system comprises a solid polymer fuel cell stack 1 and a fuel processor 2 comprising a reformer. A supply of fuel 3 (for example, methanol) provides feedstock to the reformer. The fuel is reformed and processed, generating a hydrogen rich but impure fuel stream comprising a significant concentration of carbon monoxide impurity. The impure fuel stream is supplied to the fuel cell inlet 5 of the fuel cell stack 1. A supply of oxidant 4 (for example, compressed air) is supplied to the oxidant inlet 6 of the fuel cell stack 1. As depicted, the fuel and oxidant streams supplied to the fuel cell stack 1 are exhausted at fuel and oxidant outlets 7 and 8 respectively. The system also comprises an oxygen supply and a flow controller 10 for introducing a variable amount of oxygen into the fuel stream upstream of the fuel cell stack at 11. For simplicity, the oxygen supply is preferably air, obtained via a bleed line 9 branching off the oxidant stream supplied to the fuel cell stack 1. As depicted, the system also comprises a sensor cell 12 whose voltage output or performance is particularly sensitive to carbon monoxide. Sensor cell 12 is preferably situated within the fuel cell stack 1. Thus, sensor cell 12 effectively monitors the carbon monoxide level in the fuel stream directed to stack 1. The voltage of the sensor cell 12 is then used as a signal to adjust flow controller 10.

Flow controller 10 controls the concentration of air introduced into the fuel stream. Flow controller 10 comprises a flow control valve having an opening that is variable in accordance with the signal from sensor cell 12 and with the desired bleed method (for example, pulsed or other waveform, proportional, or combinations thereof). For example, the ratio of the sensor cell voltage to the average voltage of fuel cells in the stack may be used to trigger an air bleed pulse. The timing of an air bleed pulse and the concentration of air introduced will depend on the characteristics and operation of the sensor cell and the fuel cell stack. Also, depending on the operation of the fuel cell system, it may be necessary to monitor certain other system parameters to achieve this control. For example, if the fuel stream flow rate is variable (which it typically is), then the amount of air to be introduced will also be a function of that, if a particular concentration is to be maintained. Thus, the fuel stream flow rate may need to be monitored and used as an input to flow controller 10. Flow controller 10 may comprise a processor for processing multiple input signals to determine a desired setting for a flow control valve. Those skilled in the art may readily determine a suitable configuration of conventional flow controllers and/or parameter measuring devices for a specific fuel cell system application.

In this embodiment then, flow controller 10 can be used to adjust the amount of air bleed in accordance with the concentration of carbon monoxide entering the fuel cell stack 1. In systems where the carbon monoxide level varies significantly, the air bleed can thus be adjusted to reduce or eliminate the effect of carbon monoxide poisoning without using an excess of introduced air. The ability to adjust air bleed is particularly beneficial during start-up of many reformers where higher levels of carbon monoxide are typically produced, or during rapidly varying fuel cell loads where the reformer output needs to respond to transient load increases and the quality of the fuel stream may vary.

In addition, flow controller 10 can be used to introduce air in a periodic or cyclic fashion. For example, a programmable flow controller can be programmed to admit air according to some programmed waveform (for example, sinusoidal, sawtooth, square wave). Alternatively, a flow controller that oscillates between two or more different states (for example open/closed) as determined by some measured input can effectively introduce air in periodic fashion (as in the periodic air pulses shown in FIG. 4 following). This feature is beneficial since enhanced reactivity of impurities can occur on electrocatalysts during periodic operation as opposed to steady state operation. Particularly, the reaction of carbon monoxide and oxygen can be enhanced on platinum type electrocatalysts. By introducing air in a periodic fashion, it is possible to mitigate the effect of carbon monoxide poisoning using less oxygen than would otherwise be required when introducing a constant concentration of air. Therefore, while the system in FIG. 1 represents a preferred embodiment, a benefit can be obtained even when the flow controller 10 operates independently of any system characteristic (for example, independent of sensor cell 12). With a periodic introduction of air, less oxygen needs to be introduced to mitigate the effect of carbon monoxide poisoning to the same extent. Thus, such a system can also achieve improved performance over that obtained with a constant air bleed.

If the air bleed is introduced independently of the concentration of impurity present, a suitable pulsed air bleed system can be quite simple in principle. By way of example, the flow controller 10 in FIG. 1 might comprise a check valve in a system employing flow reversal of the oxidant stream (as described in U.S. patent application Ser. No. 08/980,496, filed Dec. 1, 1997, by the same applicant as the present application). With oxidant flow reversal, the oxidant flow direction through the fuel cells reverses periodically (that is, inlet 6 and outlet 8 periodically become outlet 6 and inlet 8 in FIG. 1) and the line supplying inlet 6 undergoes a high and low pressure cycle with each reversal. The check valve and bleed line geometry 9 could be set to give a specific oxidant bleed into the fuel line during the high pressure part of the cycle in the line supplying inlet 6 and to give no oxidant bleed during the low pressure part of the cycle. In this example, it may be desirable to incorporate means for controlling the amount of oxygen introduced during the high pressure part of the cycle.

Nonetheless, a particularly preferred air bleed method involves the periodic introduction of air in accordance with a measurement indicative of the concentration of impurity present. The use of a series of pulses is a convenient way of introducing a given amount of air in a periodic fashion. The amount of air admitted to the fuel stream at any given time is determined by the amplitude of a pulse. The total amount of air admitted over a given time period however is determined by the amplitude, width, and frequency of pulses. The preferred set of pulse characteristics can be expected to vary somewhat depending on the fuel cell system. For instance, depending on the reaction kinetics and heat transfer characteristics in specific fuel cells, it may be advantageous to employ pulse amplitudes that are greater than conventional air bleed levels without making localized heating significantly worse. Nonetheless, when the pulse amplitude is less than or equal to constant conventional air bleed levels, temporary localized temperature increases may be reduced and temporary fuel starvation in the fuel cell stack may be avoided. Conversely however, the pulse amplitude is preferably not so small that oxidation of the impurity is not complete.

The following examples have been included to illustrate different embodiments and aspects of the invention but these should not be construed as limiting in any way. For instance, while the variable oxygen introduction method is particularly advantageous for use in substantially reducing the effect of or preventing carbon monoxide poisoning in solid polymer fuel cells, the method may also be effective with other impurities, such as carbon dioxide or methanol, in these or other types of fuel cells.

EXAMPLES

A fuel cell system for test purposes was configured generally as outlined in FIG. 1 and the preceding description. The fuel cell stack consisted of a number of conventional solid polymer fuel cells and a sensor cell. The membrane electrode assemblies in the conventional cells employed a cathode and anode having platinum and platinum-ruthenium electrocatalysts, respectively, applied to porous carbon fiber paper substrates (TGP-090 grade from Toray), and a Nafion™ solid polymer membrane. The sensor cell was constructed to be sensitive to carbon monoxide as described in the aforementioned U.S. Provisional Patent Application Ser. No. 60/091,531, and differs from the conventional fuel cells primarily in the choice of electrocatalyst and the ionomer loading used in the anode. The sensor cell employed a platinum black electrocatalyst loaded at about 1 mg/cm$^2$ and about a 40% ionomer loading (approximately twice that of the conventional fuel cells).

The fuel supply used was a humidified gas comprising about 63% hydrogen, 20% carbon dioxide, 17% nitrogen and varied concentrations of carbon monoxide impurity as indicated in the following. Fuel was supplied at a pressure of about 23 psig and with a stoichiometry (that is, the ratio of the amount of fuel supplied to the amount of fuel actually consumed in the electrochemical reactions) of about 1.2. The oxidant used was air at a pressure of about 23 psig and with a stoichiometry of about 1.5. The fuel cell stack was operated at approximately 75° C. and at current densities as indicated below.

Figure 2:
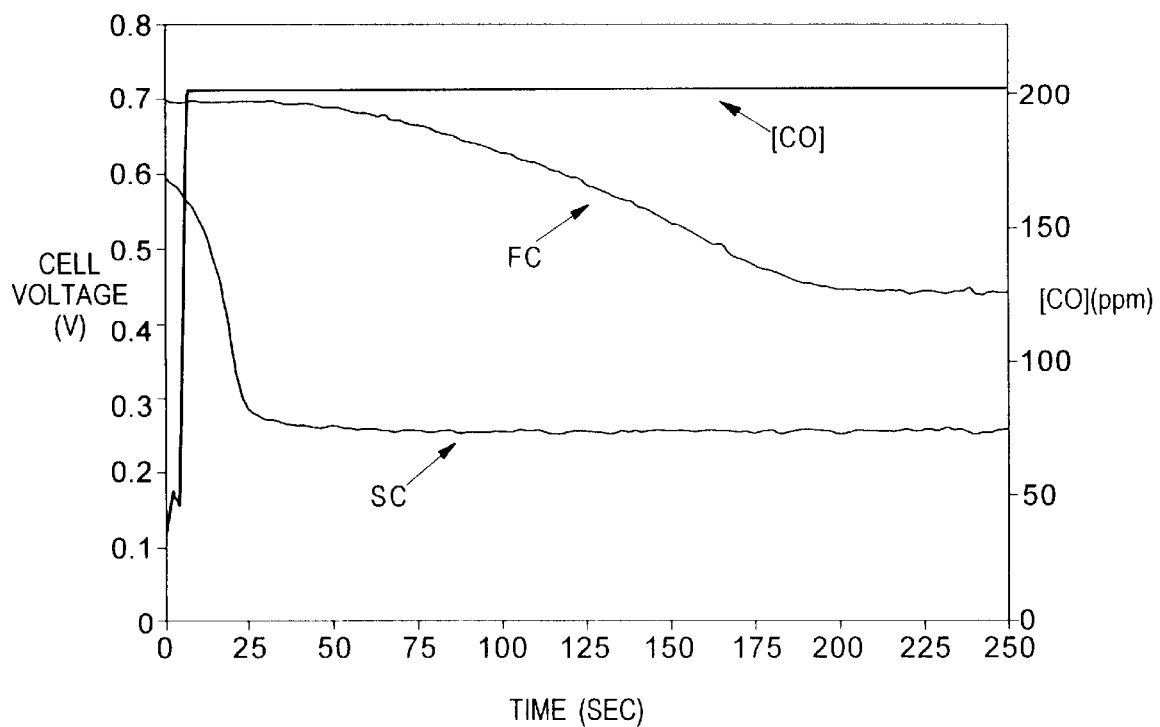
FIG. 2 is a plot showing the voltage of a representative fuel cell and a sensor cell versus time when 200 ppm carbon monoxide is introduced into the fuel stream.

FIG. 2 shows the voltage of a representative conventional fuel cell ("FC") and the sensor cell ("SC") versus time at a current density of 500 mA/cm$^2$ when 200 PPM carbon monoxide was introduced into the fuel stream. Also shown in this FIG. is the carbon monoxide level as determined by an infrared carbon monoxide sensor located upstream of the humidifier in the fuel inlet of the stack. No air bleed was used in this comparative example. Initially (time=0), the voltages of the representative fuel and sensor cells are about 0.7 and 0.6 volts respectively. With the introduction of carbon monoxide in the fuel stream, the voltage of both cells dropped substantially, although the sensor cell reacted much more quickly and adversely to the presence of carbon monoxide. This example shows the adverse effect of carbon monoxide on fuel cell performance and also demonstrates the effectiveness of the sensor cell in early detection of carbon monoxide contamination.

Figure 3A:
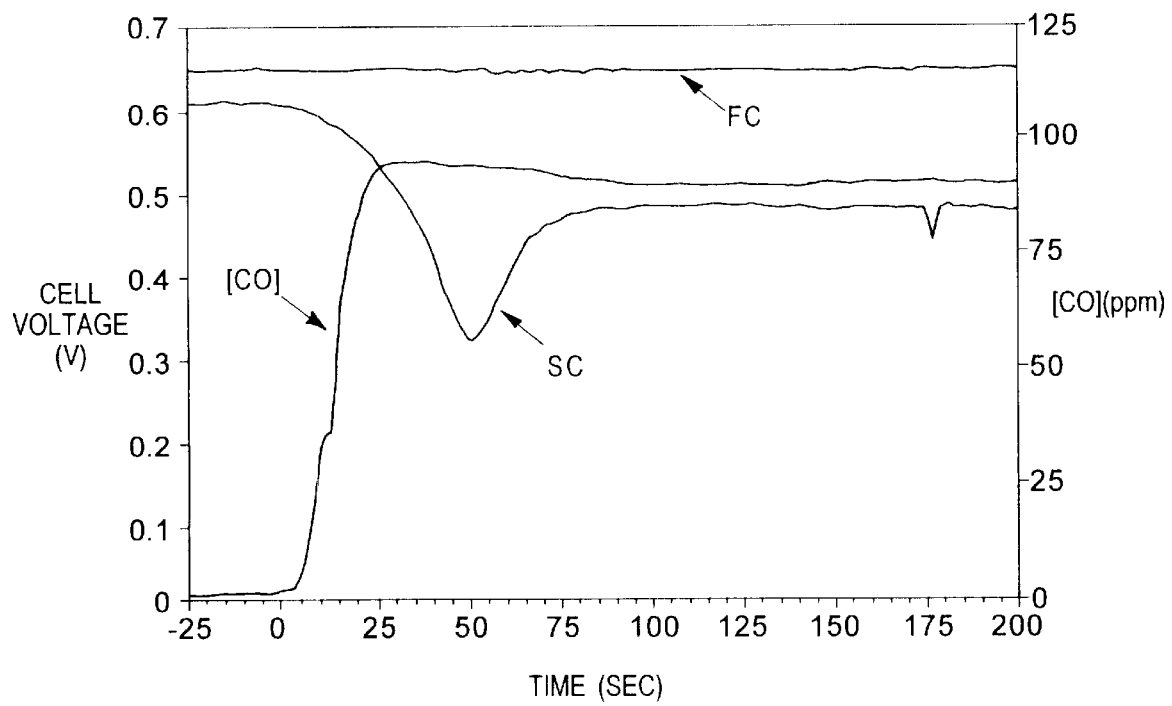
FIGS. 3a and 3b are plots showing the voltage of a representative fuel cell and a sensor cell versus time at different current densities and exposed to a fuel stream with varied carbon monoxide levels to illustrate how the sensor cell may be used to trigger a variable air bleed.

The performance was then restored by introducing 4% air (by volume) into the fuel stream to oxidize carbon monoxide in the cells. The flow controller was then set so as to introduce a baseline level of 0.8% air into the fuel stream that would increase to a 4% air bleed level if the sensor cell voltage fell more than 100 mV. FIG. 3a shows voltages of the representative fuel cell, FC, and the sensor cell, SC, versus time (t) at a current density of 500 mA/cm$^2$. (In FIG. 3a, the time axis origin, t=0, is located 25 seconds after data collection starts.) The carbon monoxide concentration is also shown. Initially, a baseline level of 2 ppm carbon monoxide was introduced into the fuel stream. The initial voltages of each cell were thus not quite the same as those in FIG. 2 due to the presence of carbon monoxide and air bleed. At t=0 seconds, the carbon monoxide level was increased to approximately 100 ppm. At about t=30 seconds, the sensor cell voltage dropped sufficiently to trigger the flow controller, thereby increasing the air bleed level to 4%. The sensor cell voltage can be seen to recover somewhat thereafter. The voltage of the representative fuel cell however is essentially stable over this whole period. Thus, using the sensor cell, it is possible to actually prevent carbon monoxide from adversely affecting performance of the conventional cells in the system.

Figure 3B:
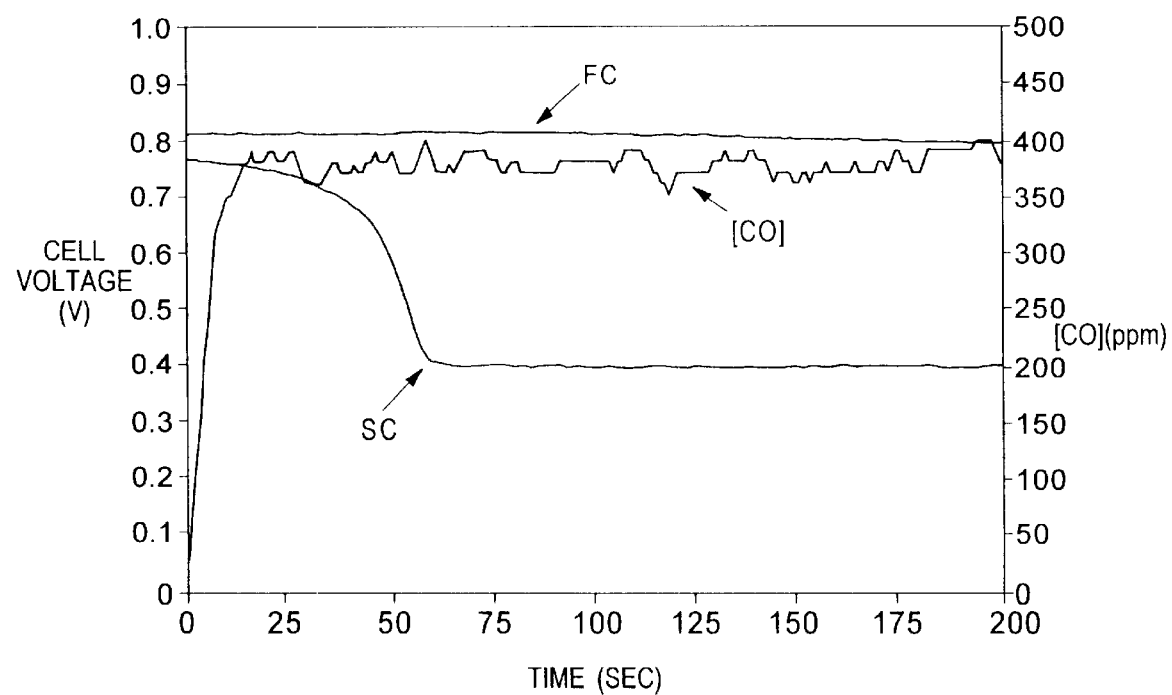

FIG. 3b shows the results of a similar test except the cells were operated at a current density of 100 mA/cm$^2$ and the carbon monoxide level was increased to 400 ppm (instead of 100 ppm). The plot shown in FIG. 3b begins (that is t=0) at the point when the carbon monoxide level was increased from 2 to 400 ppm carbon monoxide. Again, the sensor cell triggers at about t=44 seconds, raising the air bleed level from 0.8% to 4%, and thereby maintaining the voltage of the representative fuel cell.

Figure 3C:
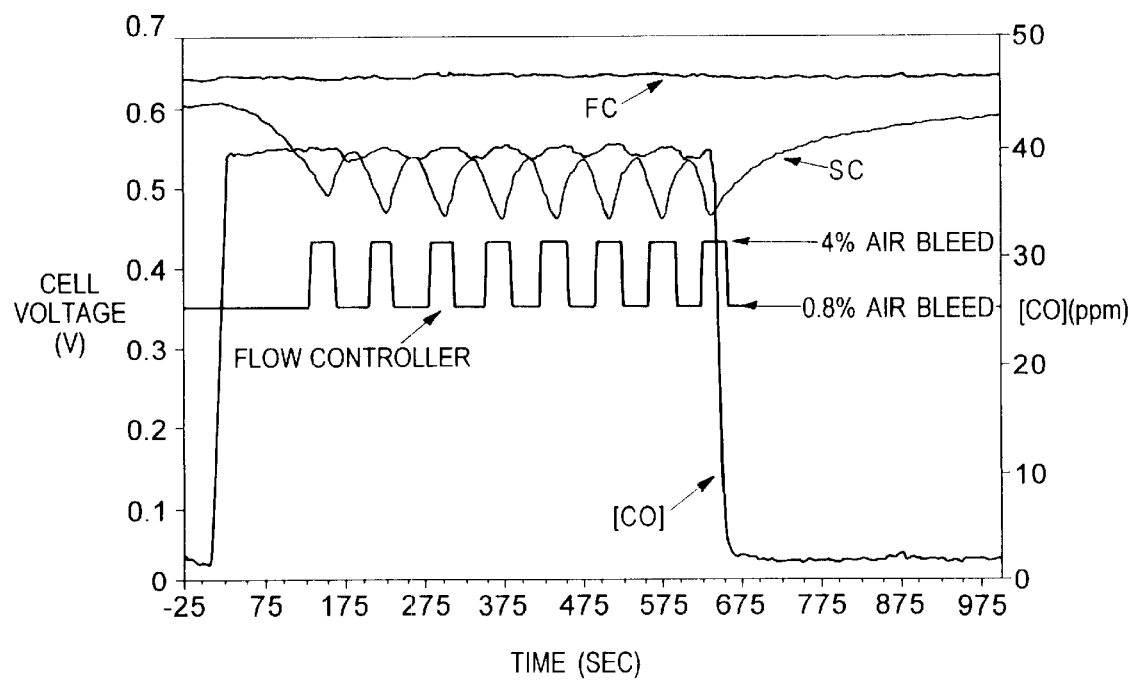
FIG. 3c is a plot showing the voltage of a representative fuel cell and a sensor cell versus time in a system in which the sensor cell is used to trigger the introduction of a series of air bleed pulses into the fuel stream in response to a transient increase in carbon monoxide level.

FIG. 3c shows the results of a similar test except the cells were operated at a current density of 500 mA/cm$^2$ and the carbon monoxide level was first increased to 40 ppm at t=0 seconds and then decreased again to 2 ppm at about t=635 seconds. (In FIG. 3c, the time axis origin, t=0, is also located 25 seconds after data collection starts.) The state of the flow controller (that is air bleed level) versus time is also shown schematically in FIG. 3c. Under these conditions, the sensor cell voltage first dropped over 100 mV thereby triggering an increase in air bleed. However, the sensor cell voltage then recovered after 30 seconds thereby triggering a return to the baseline air bleed level. Eventually, about 40 seconds later, the sensor cell voltage again dropped to trigger the increased air bleed level and these pulses continued until the carbon monoxide concentration was reduced from 40 ppm back to 2 ppm. The net result of this oscillation is that the air bleed was supplied in a pulsed, periodic manner during the period of high carbon monoxide concentration in the stream. Again, the voltage of the representative fuel cell was maintained throughout. These results show that a variable air bleed method, which uses the output of a sensor cell for control, can be effective in practice to deal with varying levels of carbon monoxide in the fuel stream of an operating fuel cell.

Figure 4:
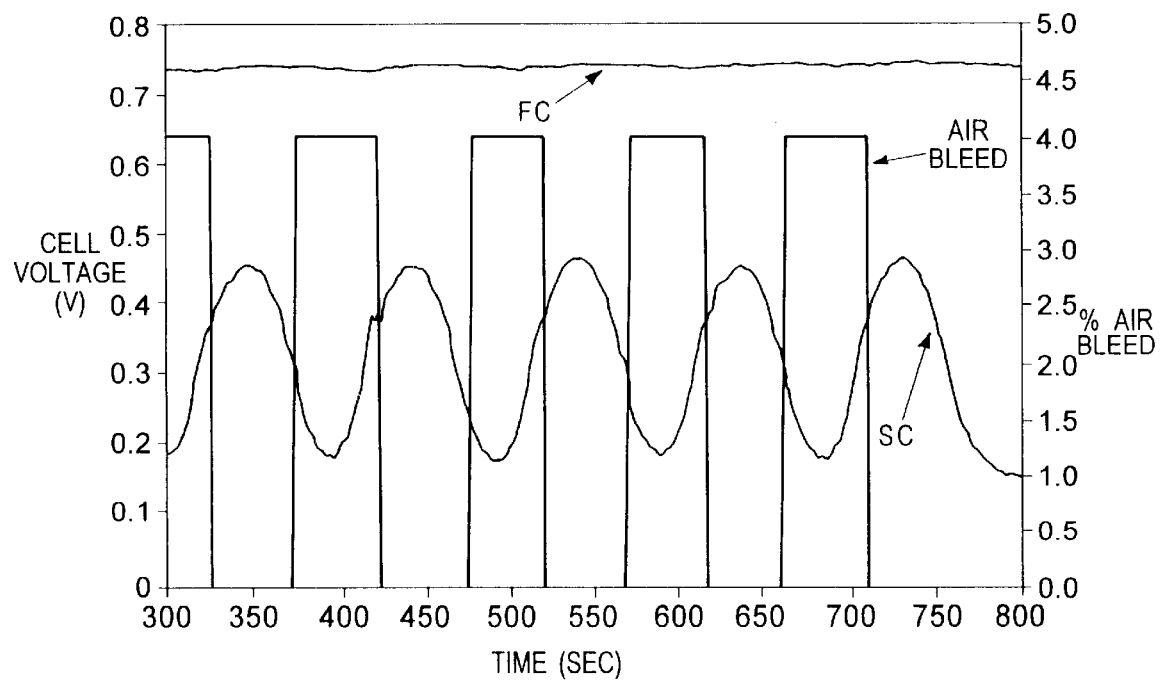
FIG. 4 is a plot showing the voltage of a representative fuel cell and a sensor cell versus time in a system in which the sensor cell is used to trigger the introduction of a series of air bleed pulses in response to a carbon monoxide level of 100 ppm.

Another test was performed as above except that the flow controller was set so as to introduce a baseline level of 0% air (none) into the fuel stream and to increase it to a 4% air bleed level if the sensor cell voltage fell below 350 mV. FIG. 4 shows voltages of the representative fuel cell and the sensor cell versus time (t) at an operating current density of 500 mA/cm$^2$ with a substantially constant 100 ppm level of carbon monoxide in the fuel stream over the period shown. Also shown schematically is the state of the flow controller versus time. As in FIG. 3c, the sensor cell voltage and the state of the flow controller oscillate, resulting in the introduction of a series of pulses of air into the fuel stream. Throughout, the voltage of the representative fuel cell remains essentially constant. The pulse width or duration of the air bleed was slightly less than half the oscillation period. Since air is approximately 20% oxygen, the pulsed air bleed in FIG. 4 was roughly equivalent to the continuous introduction of about 0.4% oxygen over the time period shown. This appears to prevent poisoning in conventional fuel cells operating on fuel streams containing at least up to 100 ppm carbon monoxide. However, in the aforementioned U.S. Pat. No. 4,910,099, it appears that over 2% oxygen is required to prevent poisoning from 100 ppm carbon monoxide.

Figure 5:
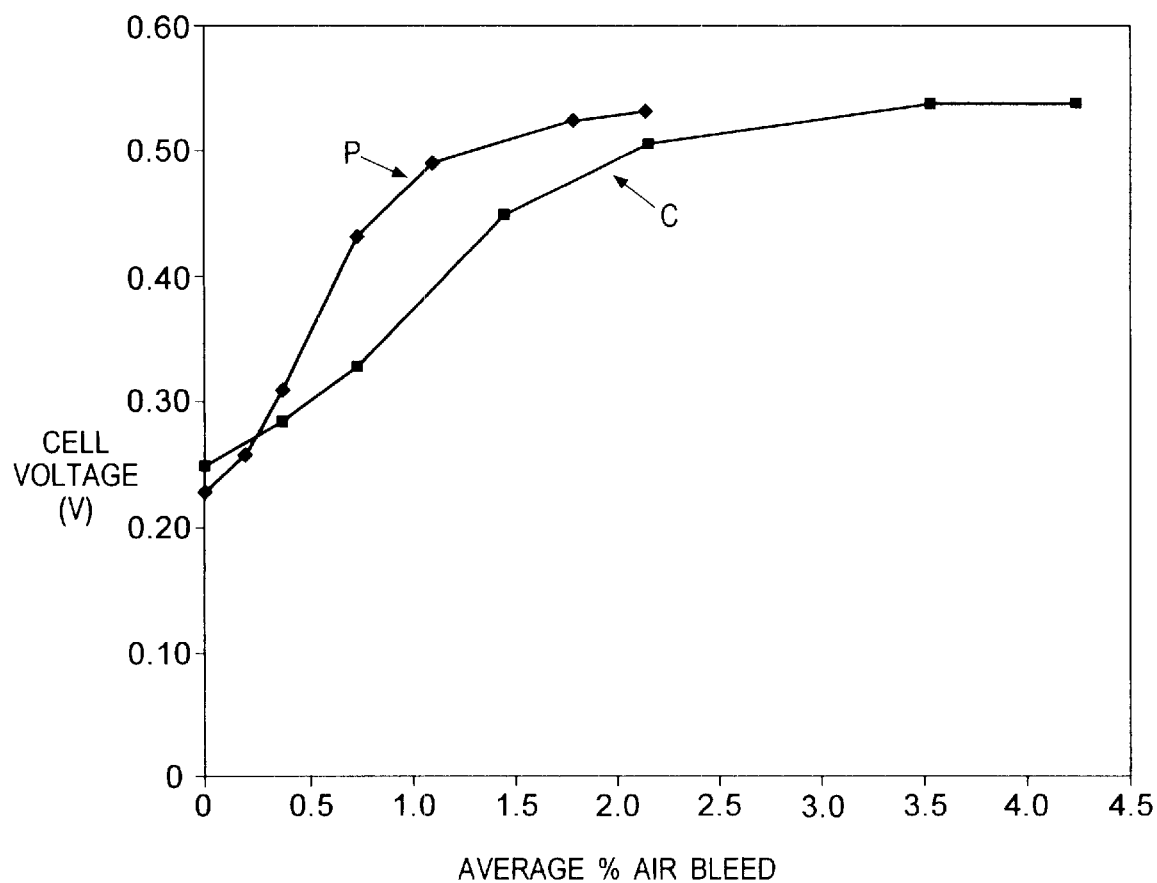
FIG. 5 is a plot showing the voltage of a representative fuel cell versus average air bleed concentration in which the air bleed was either pulsed or constant.

Finally, a test was performed to compare fuel cell performance versus air bleed concentration when an air bleed was introduced either in a series of pulses or at a conventional constant concentration. A fuel cell stack similar to the preceding stack was used, but without a sensor cell. The fuel cell stack was operated as above at a current density of 500 mA/cm$^2$ and with a constant 40 ppm carbon monoxide impurity in the fuel stream. Initially, no air bleed was employed. The system was allowed to run for about 15 minutes and the voltage of a representative fuel cell in the stack was recorded. Air was then introduced in square wave pulses with a pulse duration of 5 seconds and a period of 10 seconds (that is, 5 seconds on, 5 seconds off). No air was introduced between pulses. The air bleed concentration was increased in discrete steps, and each time after running for about 15 minutes, the voltage of the representative fuel cell was again recorded. The air bleed was then stopped and the test was repeated using constant concentrations of air bleed. FIG. 5 shows a plot of the voltage of the representative fuel cell versus average air bleed % with pulsed air bleed ("P") and with constant air bleed ("C"). (In this example, the average % air bleed concentration in the pulsed trial is thus approximately half the concentration during a pulse.) As can readily be seen in FIG. 5, less air is required to obtain a given cell voltage (that is, a given performance) using pulsed rather than constant air bleed.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A method of operating a fuel cell system on an impure fuel, said system including at least one fuel cell, a stream of said impure fuel supplied to said fuel cell, and a mechanism for introducing oxygen into said fuel stream for reaction with an impurity in said fuel stream within said fuel cell, said method comprising introducing a variable concentration of oxygen into said fuel stream periodically.

2. The method of claim 1 wherein said oxygen is introduced into said impure fuel stream in a series of periodic pulses.

3. The method of claim 1 wherein said impurity comprises carbon monoxide.

4. The method of claim 3 wherein said fuel stream comprises up to about 1000 ppm carbon monoxide.

5. The method of claim 1 wherein said impurity comprises carbon dioxide.

6. The method of claim 2 wherein the period of the pulses is in the range from about 1 to 50 seconds.

7. The method of claim 2 wherein said oxygen is introduced into said impure fuel stream in a series of periodic pulses of air.

8. The method of claim 7 wherein the concentration of air introduced into said fuel stream during said periodic pulses is less than about 4% by volume of said fuel stream.

9. The method of claim 7 wherein a substantially continuous baseline concentration of air is introduced into said fuel stream between said periodic pulses of air.

10. The method of claim 9 wherein said baseline concentration of air is less than about 0.8% by volume of said fuel stream.

11. The method of claim 2 wherein the duration of said periodic pulses is less than about half the period.

12. The method of claim 1 wherein said at least one fuel cell is a solid polymer fuel cell.

13. The method of claim 1 further comprising maintaining the fuel stoichiometry in said fuel cell at greater than or equal to 1.

14. A fuel cell system comprising:
   at least one fuel cell;
   a source of an impure fuel stream for supply to said fuel cell;
   a mechanism for introducing a variable concentration of oxygen into said impure fuel stream for reaction with an impurity in said fuel stream within said fuel cell; and
   a monitoring device for monitoring a fuel cell operating characteristic indicative of the concentration of said impurity in said fuel stream; and
   a flow controller responsive to the monitoring device for adjusting said oxygen concentration in response to said monitored operating characteristic.

15. The fuel cell system of claim 14 wherein said monitoring device comprises a sensor fuel cell.

16. The fuel cell system of claim 14 further comprising a mechanism for maintaining a sufficient amount of fuel in said impure fuel stream such that the fuel stoichiometry is greater than or equal to 1.

17. A fuel cell system comprising:
    at least one fuel cell;
    a source of an impure fuel stream for supply to said fuel cell; and
    a mechanism for introducing a variable concentration of oxygen into said impure fuel stream for reaction with an impurity in said fuel stream within said fuel cell wherein said oxygen introducing mechanism comprises a flow controller for periodically introducing oxygen into said fuel stream.

* * * * *